Jan. 21, 1964 G. D. ROBB 3,118,407
DIE SPOTTING PRESS
Filed April 18, 1960 10 Sheets-Sheet 1

INVENTOR.
GEORGE D. ROBB
BY Barthel & Bugbee
ATTORNEYS

Jan. 21, 1964  G. D. ROBB  3,118,407
DIE SPOTTING PRESS
Filed April 18, 1960  10 Sheets-Sheet 2

INVENTOR.
GEORGE D. ROBB
BY
Barthel & Bugbee
ATTORNEYS

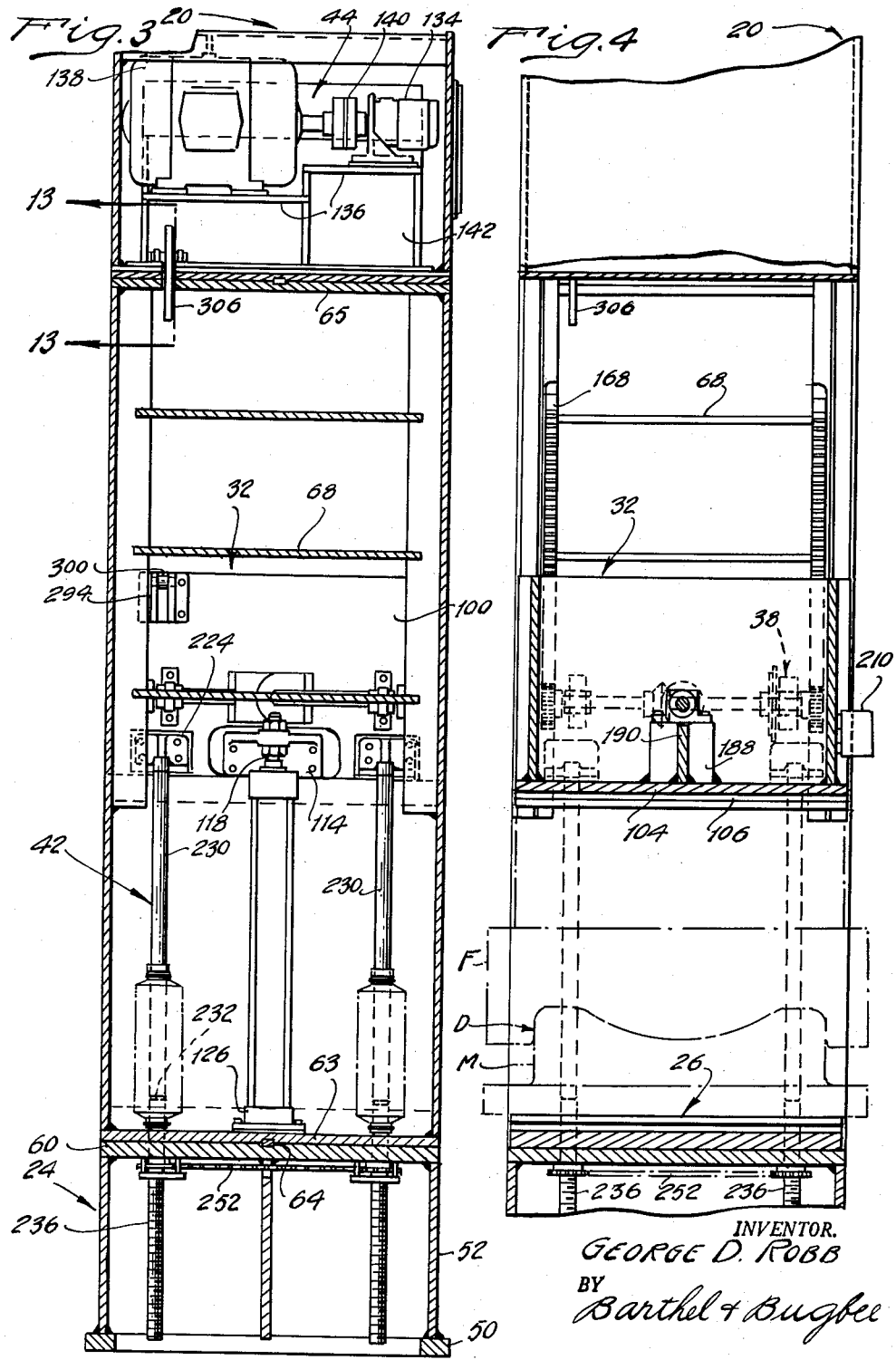

Jan. 21, 1964  G. D. ROBB  3,118,407
DIE SPOTTING PRESS
Filed April 18, 1960  10 Sheets-Sheet 4
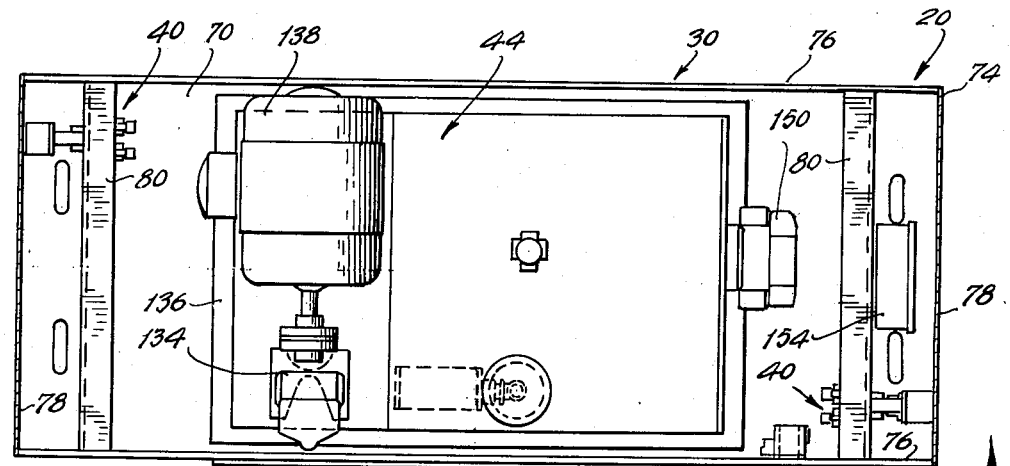
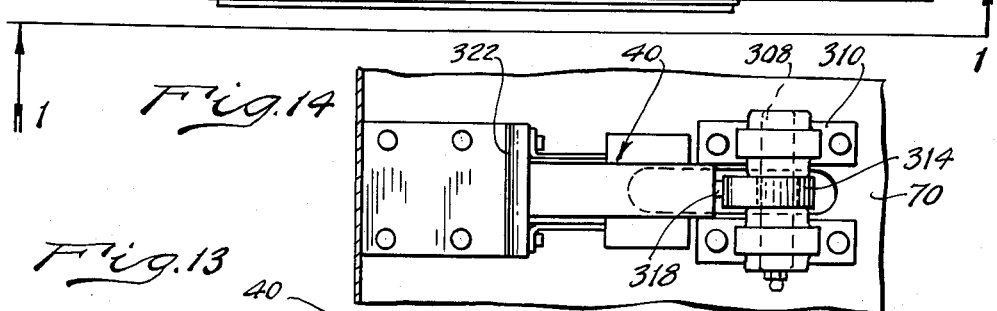
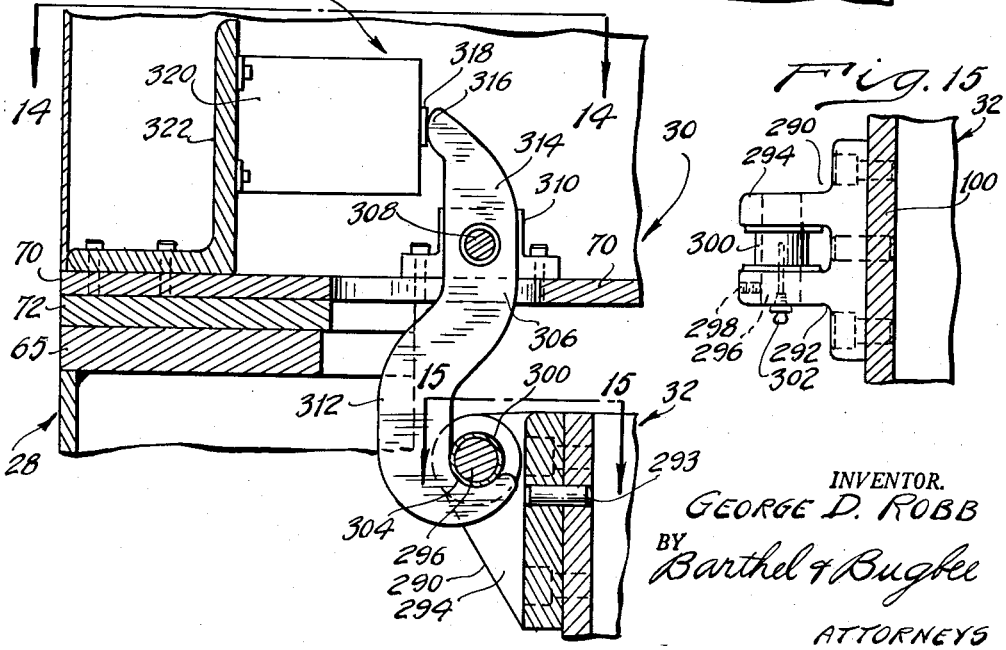
INVENTOR.
GEORGE D. ROBB
BY
Barthel & Bugbee
ATTORNEYS Jan. 21, 1964  G. D. ROBB  3,118,407
DIE SPOTTING PRESS
Filed April 18, 1960  10 Sheets-Sheet 5
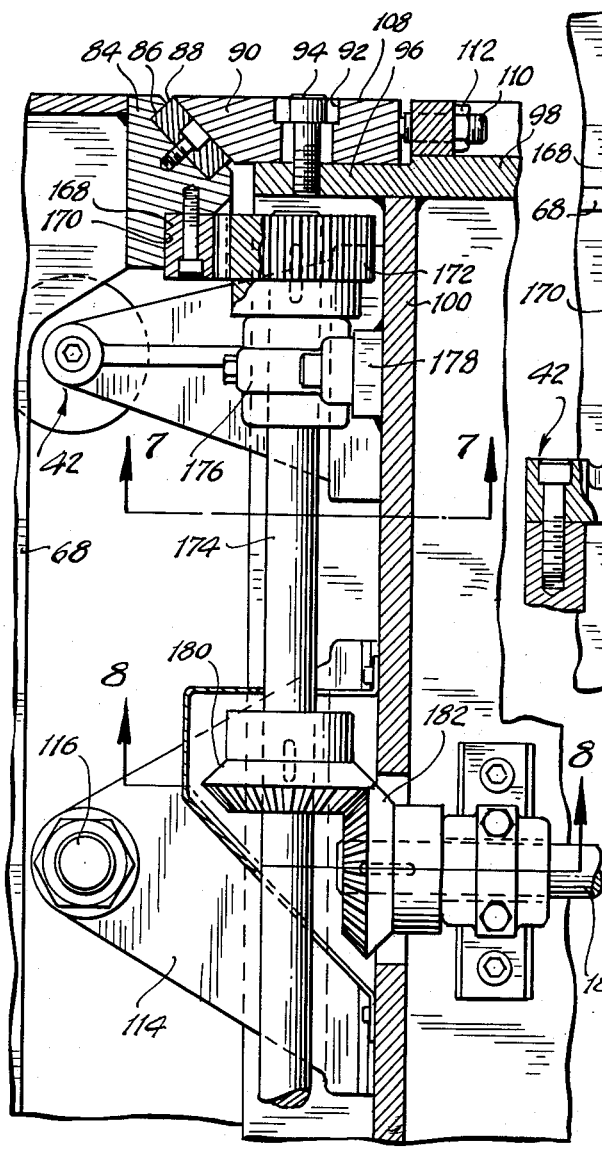
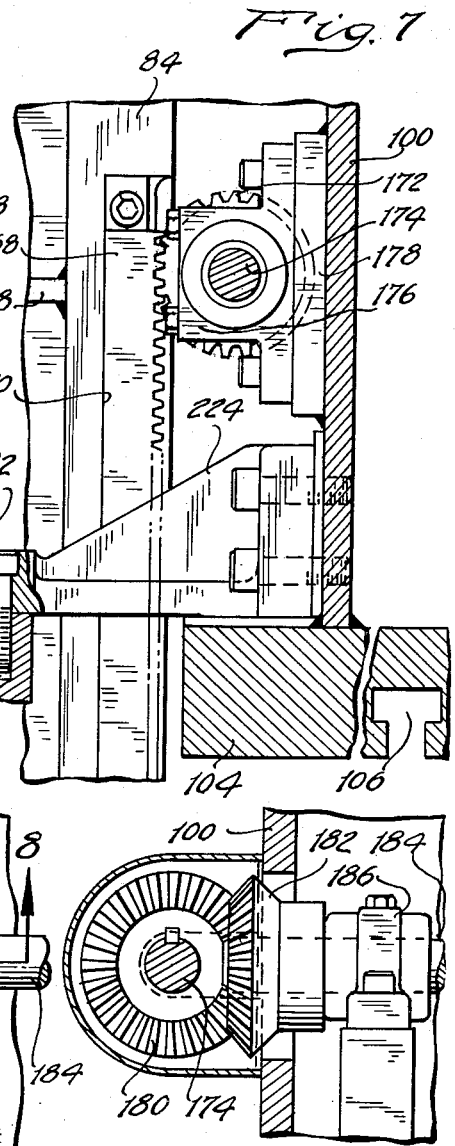
INVENTOR.
GEORGE D. ROBB
BY
Barthel & Bugbee
ATTORNEYS Jan. 21, 1964    G. D. ROBB    3,118,407
DIE SPOTTING PRESS
Filed April 18, 1960    10 Sheets-Sheet 6
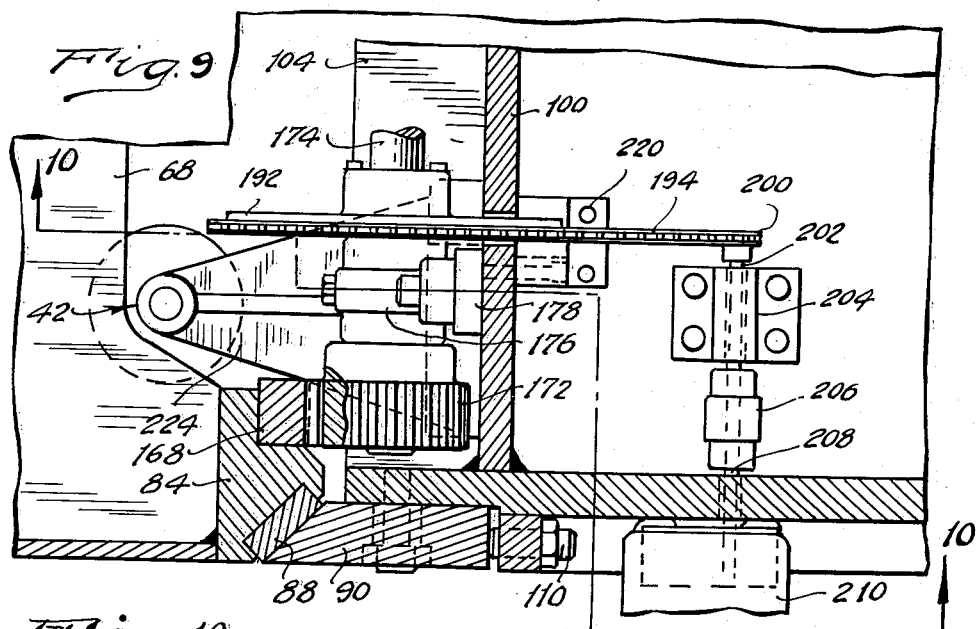
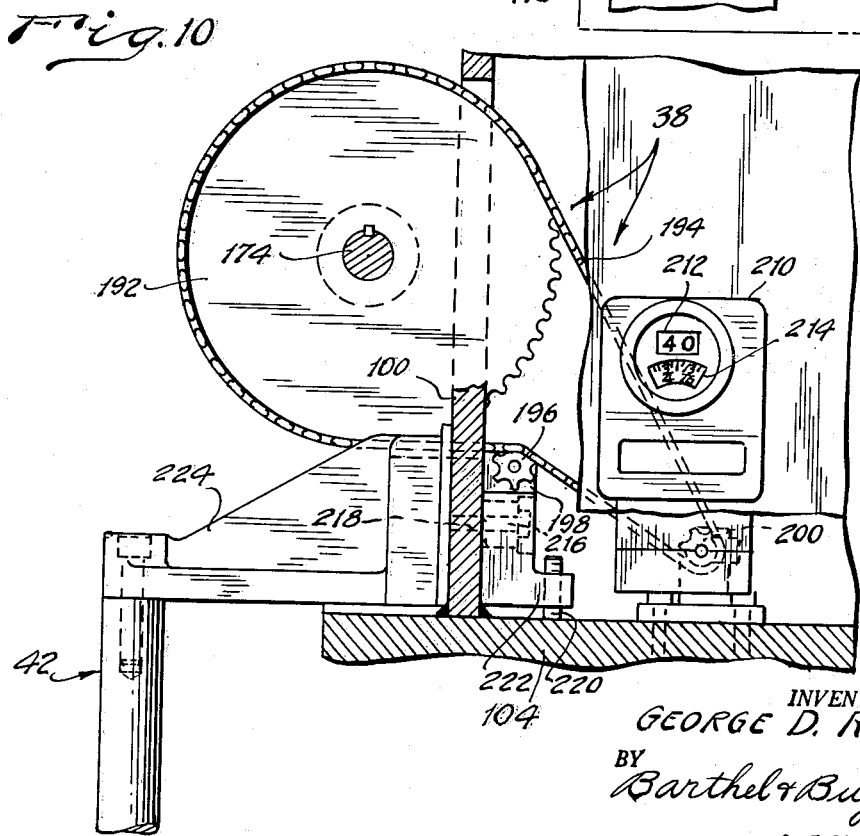
INVENTOR.
GEORGE D. ROBB
BY
Barthel & Bughe
ATTORNEYS Jan. 21, 1964 — G. D. ROBB — 3,118,407
DIE SPOTTING PRESS
Filed April 18, 1960 — 10 Sheets-Sheet 7

INVENTOR.
GEORGE D. ROBB
BY
Barthel & Bugbee
ATTORNEYS

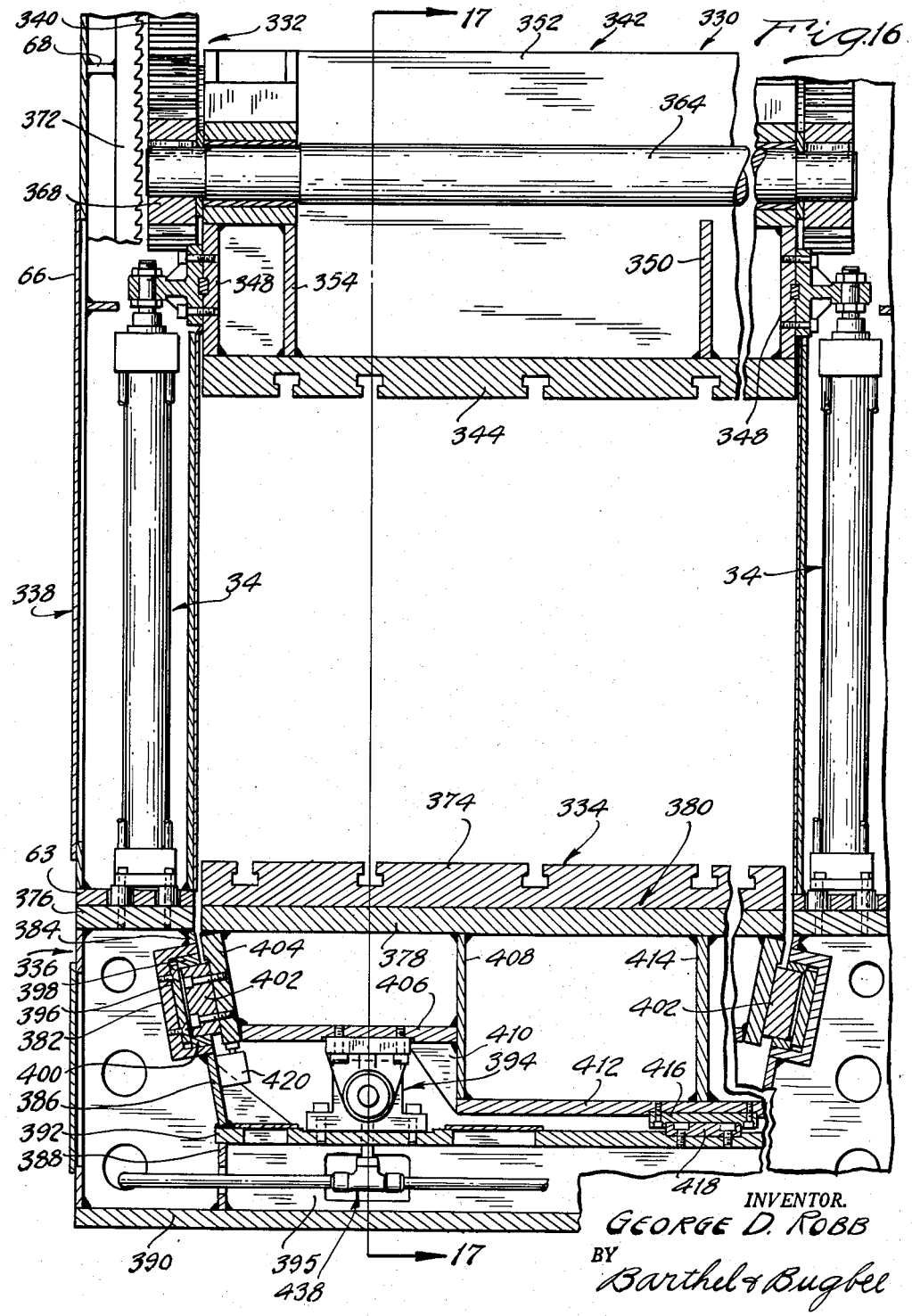

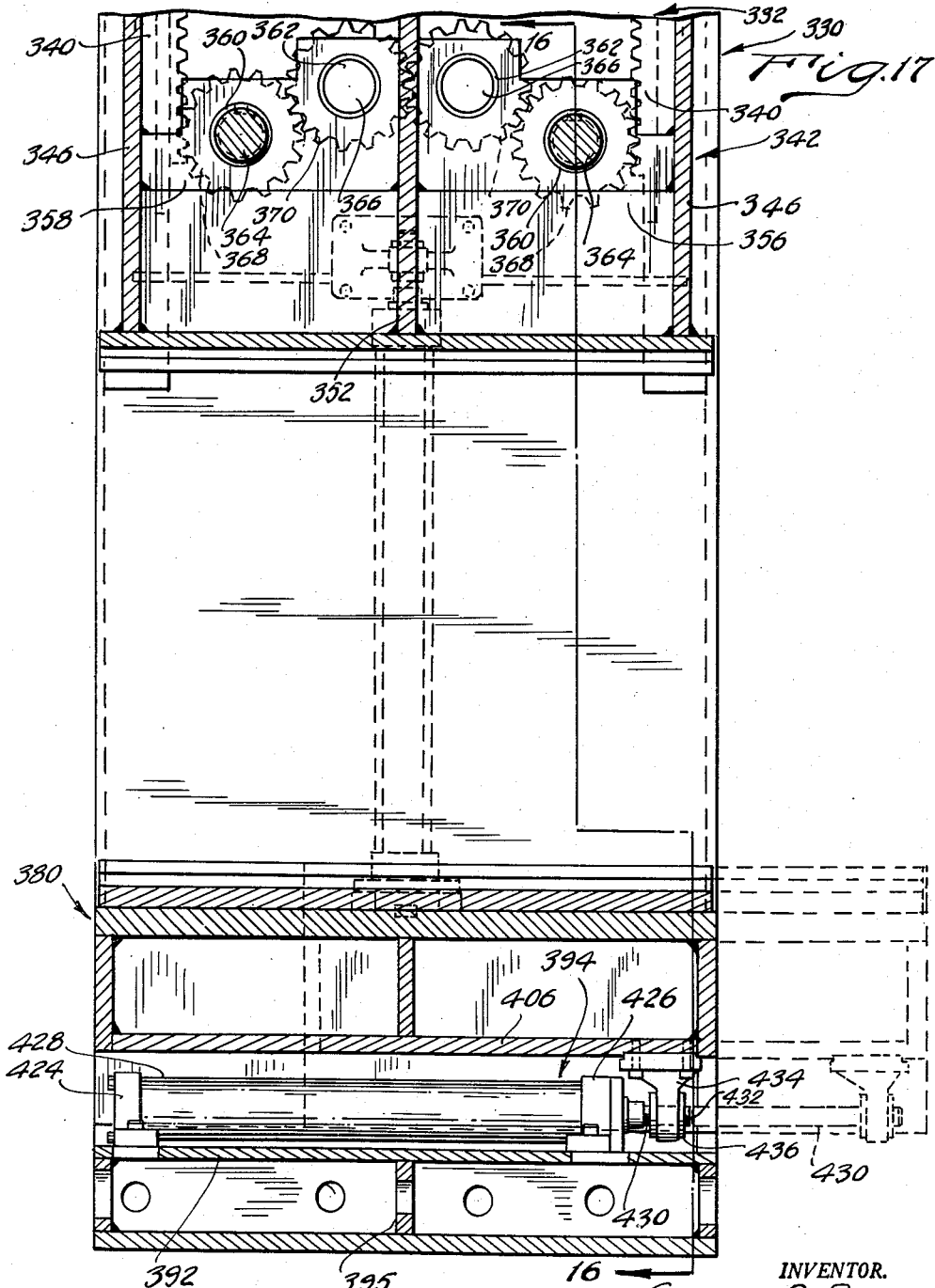

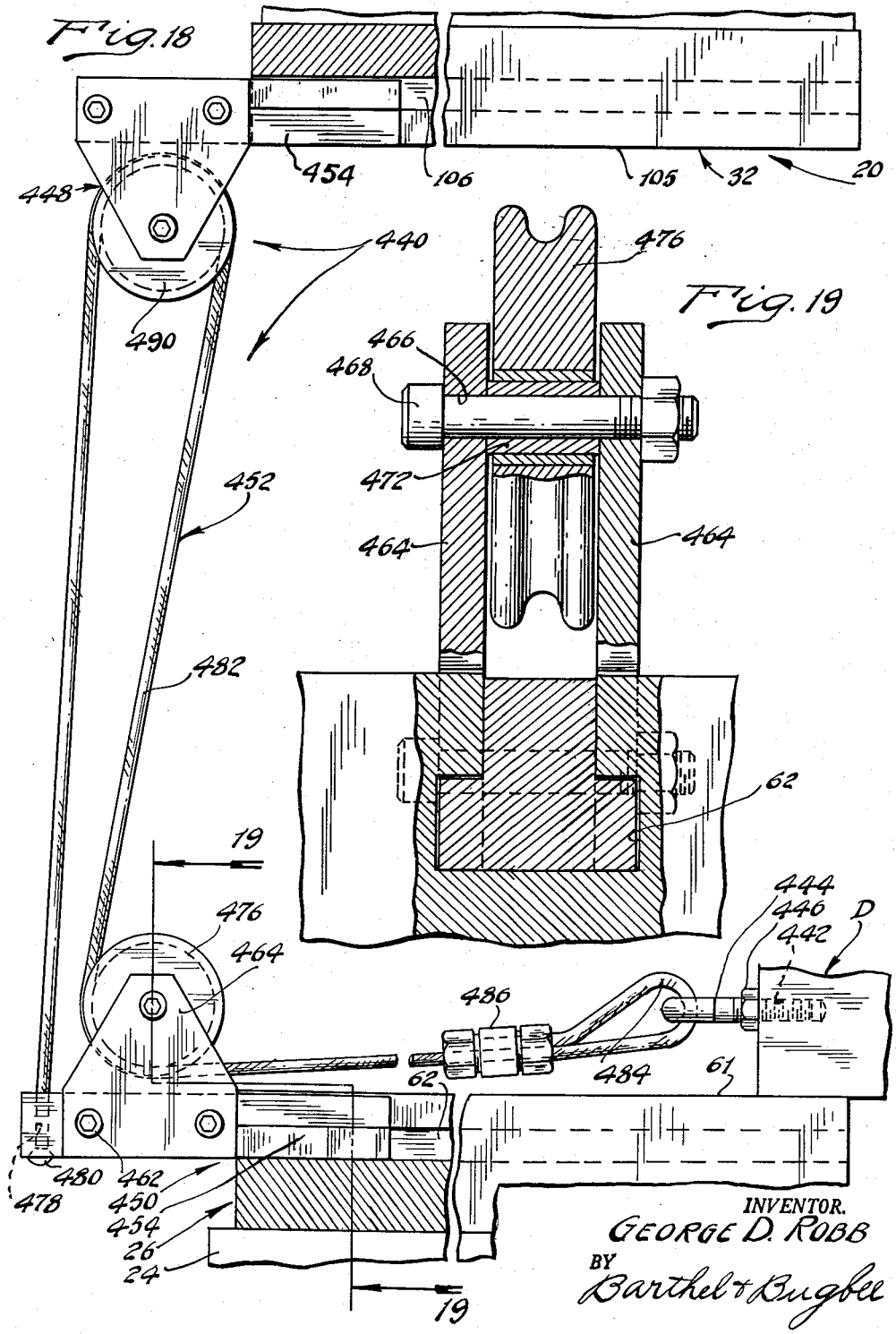

United States Patent Office 3,118,407
Patented Jan. 21, 1964

3,118,407
DIE SPOTTING PRESS
George D. Robb, Birmingham, Mich., assignor to Federal Engineering Company, Detroit, Mich., a corporation of Michigan
Filed Apr. 18, 1960, Ser. No. 23,005
5 Claims. (Cl. 113—38)

This invention relates to presses and, in particular, to die spotting presses for use in mating the opposing halves of a die set without tying up production presses for such alterations and adjustments.

One object of this invention is to provide a die spotting press having self-acting means associated with the platen thereof for automatically accurately and continuously maintaining the die-supporting surface of the platen accurately parallel with the opposing die-supporting surface of the bolster on the press bed, so that the upper and lower die halves spotted in the spotting press to accurately mate with one another there will also accurately mate with one another subsequently when mounted in the production press, without the need for the subsequent parallel machining previously required.

Another object is to provide a die spotting press of the foregoing character wherein the press platen is forcibly held in accurate parallelism with the press bolster during the entire range of its ascent and descent by heavy duty self-equalizing levelling gearing within close tolerances and requiring no external adjustment.

Another object is to provide a die spotting press, as set forth in the preceding objects, wherein the levelling gears are disposed at the four corners of the press in engagement with four precision racks mounted upon the press frame and interconnected by mechanism which prevents the platen from deviating from parallelism with the bolster at any point in its stroke.

Another object is to provide a die spotting press having platen stops extending upward from the bottom portion of the press frame where they support only their own weight, and simultaneously adjustable to move upward or downward, in contrast with prior stops wherein the stops were mounted upon the upper portion of the press and had to support not only their own weight but also the entire weight of the platen and the die half attached to it for spotting.

Another object is to provide a die spotting press of the foregoing character wherein the platen is raised by means of hydraulic cylinders mounted on and extending upward from the bottom part of the press independently of the die-supporting bolster, so as to avoid distorting the bolster during operation.

Another object is to provide a die spotting press wherein the operating apparatus including the hydraulic pump and its driving motor are mounted in a detachable press head or crown which may easily be removed as a "package unit" for repair or maintenance of such apparatus.

Another object is to provide a die spotting press wherein the press head is provided with automatic platen latches which enhance safety of operation by automatically holding the platen in its raised position and preventing its unintended descent in the event of a power failure, yet which latches are automatically released by means responsive to the intended lowering of the platen.

Another object is to provide a die spotting press wherein its construction for the most part is capable of utilizing standard parts available on the open market, for example, standard gibs, ways, toothed racks, gears, shafts and bearings, and not requiring the specially-built parts of prior spotting presses yet achieving equal or superior accuracy of operation.

Another object is to provide a die spotting press of the foregoing character wherein the press frame is in the form of a weldment which replaces expensive and heavy castings previously used and which is of specially-reinforced construction to give the requisite strength and freedom from distortion without excessive weight, and which at the same time provides a hollow structure which also serves as a housing for hydraulic and electrical equipment and their connections with ready accessibility thereof.

Another object is to provide a die spotting press of the foregoing character with precision platen-position-indicating means enabling the operator to tell at a glance the exact distance between the platen and bolster and thus the extent of the opening between the die halves at any point during the stroke of the platen.

Another object is to provide a slightly modified die spotting press wherein the press bed includes a die-supporting bolster in the form of a slide which is movable into and out of the press frame on hardened and ground ways by power-operated mechanism which insures return of the bolster to its exact original location.

Another object is to provide a die spotting press having a die positioning device operated by the motion of the press platen or hauling a die onto the press bed, thereby greatly facilitating the handling of heavy dies and eliminating the need for a movable carriage on the press bed.

Other objects and advantages of the invention will become apparent during the course of the following description of the accompanying drawings, wherein:

FIGURE 3 is a vertical section through one of the press uprights, taken along the line 3—3 in FIGURE 1;

FIGURE 4 is a vertical section taken along the line 4—4 in FIGURE 1;

FIGURE 5 is a top plan view, partly in horizontal section, of the press shown in FIGURE 1;

FIGURE 6 is an enlarged fragmentary horizontal section of the portion of the press in the lower right-hand corner of FIGURE 2;

FIGURE 7 is a fragmentary vertical section taken along the line 7—7 in FIGURE 6;

FIGURE 8 is a fragmentary vertical section taken along the line 8—8 in FIGURE 6;

FIGURE 9 is an enlarged fragmentary horizontal section comprising substantially the lower left-hand corner of FIGURE 2 showing the platen-position-indicating mechanism;

FIGURE 10 is a vertical section, partly in front elevation, taken along the line 10—10 in FIGURE 9;

FIGURE 13 is an enlarged fragmentary vertical section taken along the line 13—13 in FIGURE 3, showing one of the platen safety latches;

FIGURE 14 is a top plan view looking along the line 14—14 in FIGURE 13;

FIGURE 15 is a horizontal section taken along the line 15—15 in FIGURE 13;

FIGURE 16 is a fragmentary vertical section through the lower portion of a slightly modified spotting press having an extensible bolster, taken along the line 16—16 in FIGURE 17;

FIGURE 17 is a vertical section taken along the line

Figure 1:
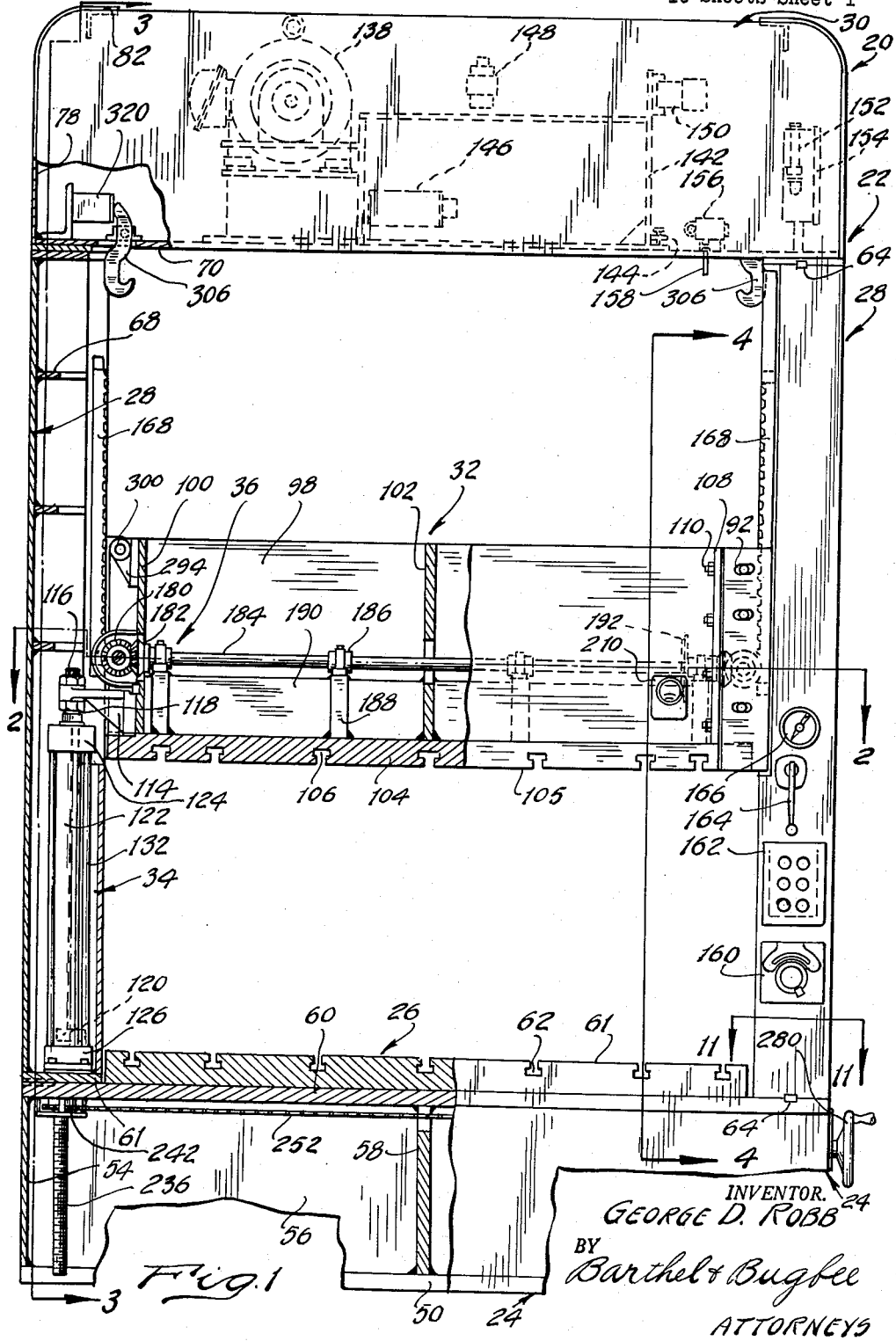
FIGURE 1 is a front elevation of a die spotting press, according to one form of the invention, partly in vertical section along the lines 1—1 in FIGURES 2 and 5, showing the platen in its lowered position against its stops.

17—17 in FIGURE 16, with the partly-extended position of the bolster shown in dotted lines;

FIGURE 18 is a fragmentary side elevation, partly in section, of a press bed and platen equipped with a die positioning device, according to one form of the invention; and FIGURE 19 is an enlarged fragmentary vertical section taken along the broken line 19—19 in FIGURE 18.

Hitherto, die spotting presses have been provided for holding the cooperating die halves of a large die set, such as are used for producing large stampings like automobile fenders and body parts, while they are being worked upon for slight but precise removals of stock in order to cause them to accurately mate while leaving the necessary clearance for the thickness of the sheet metal from which the stamping is to be made by the die set. The use of a die spotting press for this purpose avoids the necessity of tying up the regular production press in which the die set is eventually to be used, and the spotting press can be made of lighter and far less expensive construction than the production press because the spotting press needs strength and power enough merely to carry the load of its own parts and the die halves without the additional strength and power necessary to perform the sheet metal stamping operation. At the same time, however, the die spotting press must be of sufficiently rigid construction to avoid any deflection during the operation of mating the die halves, and its platen should accurately move in the same relationship to the bolster or plate on the press bed carrying the lower die half, as the platen and bolster on which the die halves are mounted in the production press.

Prior to the present invention, die spotting presses have been of very expensive construction which required them to be sold at very high prices, because they were constructed with special frame castings and specially built racks, gears, gibs and ways as well as with specially machined stops depending from the upper portion of the press and required to support not only their own weight but also the weights of the spotting press platen and upper die half attached thereto. In such prior die spotting presses, moreover, the platen could not be maintained accurately in continuous parallelism with the bolster as the platen moved toward and away from the bolster, with the result that the upper and lower die halves of the die set required additional parallel machining before they could safely be used in the production press without clashing or otherwise operating in an unsatisfactory or inaccurate manner. In such prior spotting presses, furthermore, the platen, if hydraulically moved, was constantly in danger of descending in the event of a power failure, with consequent hazard to the operator. Finally, in such prior die supporting presses, the hydraulic and mechanical equipment was mounted in inaccessible locations in the press, and had to be worked upon while mounted in the press without the possibility of removal as a "package unit."

The present invention provides an improved die spotting press in which the above-mentioned disadvantages of prior spotting presses are eliminated. The present press eliminates these disadvantages and accomplishes the above objects by the construction described in detail in the following specification and illustrated in the accompanying drawings.

*General Construction and Arrangement*

Referring to the drawings in detail, FIGURES 1 to 5 inclusive show an improved die spotting press, generally designated 20, according to one form of the present invention, the details of which are additionally shown in FIGURES 6 to 15 inclusive and a slight modification with an extensible bolster in FIGURES 16 and 17. The die spotting press 20 consists generally of a frame 22 including a press bed 24 carrying a bolster 26, uprights 28 rising from the bed 24, a press head or crown 30 mounted on the upper ends of the uprights 28, and a platen 32 mounted on the uprights 28 and movable upward and downward toward and away from the bed 24 and bolster 26 by double-acting reciprocatory hydraulic motors 34 while maintained accurately in parallelism with the bolster 26 by means of an automatic platen levelling device 36 shown more particularly in FIGURE 2. At the same time, the position of the platen 32 and the extent of the opening between the platen 32 and the bolster 26 is instantly and continuously shown by a platen position indicating device, generally designated 38, shown more particularly in FIGURES 9 and 10. The platen 32 is held in its raised position and prevented from accidentally descending, in the event of a power failure, by an automatic platen safety latching device, generally designated 40, and shown more particularly in FIGURES 13, 14 and 15. A stop arrangement, generally designated 42, engages and holds the platen 32 at any desired and precise distance above the bolster 26 so as to accurately regulate the height of the opening therebetween, and is shown in general in FIGURE 3 and in detail in FIGURES 11 and 12. A motor-driven hydraulic power unit 44 is mounted on and within the press head 30.

*Press Frame Construction*

The bed 24, as also the remainder of the press frame 22, is in the form of a hollow box-form weldment (FIGURES 1 and 3) having an open-centered bottom plate 50 to which are welded upstanding front and rear walls 52, end walls 54 and crossing reinforcing partition plates 56 and 58, all welded at their upper edges to a top plate 60 upon which the plate-shaped bolster 26 rests. The opposite ends of the bolster 26 are inset from the opposite ends of the bed top plate 60 (FIGURE 1) and the bolster 60 is provided with a precisely-machined flat upper surface 61 containing spaced T-slots 62 for the reception of T-bolts (not shown) by which the lower die half M (FIGURE 4) is secured to the bolster 26.

The hollow box-shaped uprights or press frame side members 28 rise from the opposite ends of the bed top plate 60 in the spaces thereon provided by the insetting of the opposite ends of the bolster 26 and have lower and upper end plates 63 and 65 respectively (FIGURE 3) grooved to receive keys 64 half entering into the correspondingly-grooved adjacent portions of the bed 24 and head 30 respectively (FIGURE 1). Each upright or side member 28 consists of a channel-shaped member 66 (FIGURE 2) having horizontal shallow U-shaped reinforcing plates 68 disposed at vertically-spaced locations in their upper half lengths (FIGURE 1), the reinforcing plate 68 being thus cut away (FIGURE 2) and shorter than the channel member 66 to provide clearance for the hydraulic piston rods, stop rods and other mechanisms described below, as well as for hydraulic piping and electric wiring which is conventional and beyond the scope of the present invention.

The press head or crown 30 is an open-topped box-form weldment having a bottom plate 70 (FIGURES 1 and 13) beneath the opposite ends of which are supporting plates 72 which in turn rest upon and are grooved so as to be keyed to the top plates 63 of the frame uprights 28 by the keys 64 in the manner described below. Rising from the bottom plate 70 of the head 30 is a rectangular open-topped enclosure 74 with side plates 76 and end plates 78 (FIGURE 5) welded to one another. The side plates 76 are interconnected by horizontal angle cross members 80 welded thereto and have rounded upper corners between which the upper portions 82 of the end plates 78 extend into overlapping relationship with the cross members 80. The motor-driven hydraulic power unit 44 is mounted upon the bottom plate 70, as described in more detail below.

Platen and Raising and Lowering Mechanism Construction

Figure 2:
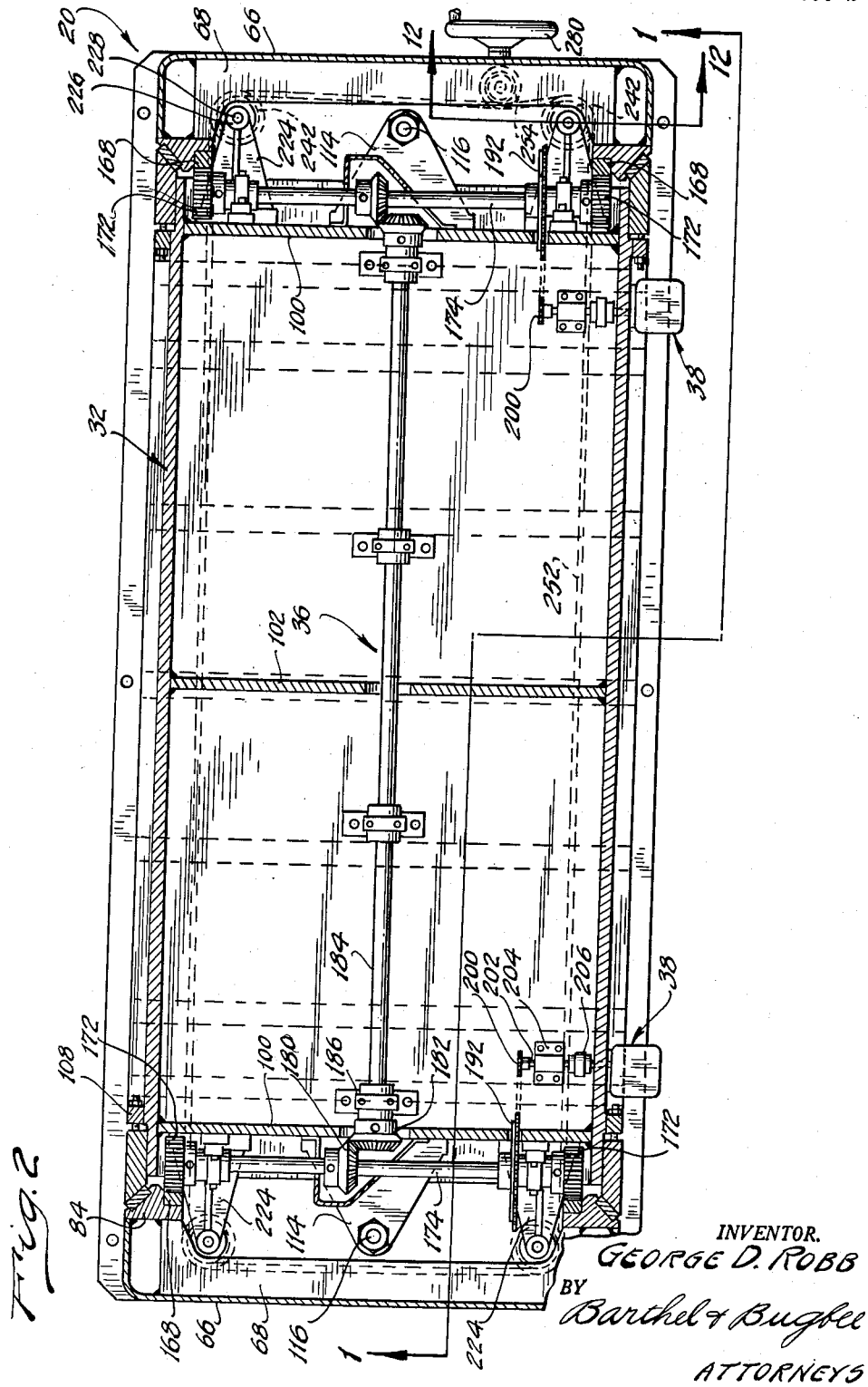
FIGURE 2 is a horizontal section through the platen, taken along the line 2—2 in FIGURE 1, showing the equalizing mechanism for automatically maintaining the platen in parallelism with the bolster.

Welded or otherwise secured to and mounted between the channel-shaped side members 66 of the press frame upright 28 and the vertically-spaced horizontal reinforcing plates 68 thereof are vertical supporting bars or ways 84 (FIGURES 2 and 6). The ways 84 have bevelled and grooved outer faces 86 receiving wear plates 88 bolted thereto and engaged by correspondingly-bevelled plate-shaped gibs 90. The latter are slotted as at 92 (FIGURE 6) to receive threaded fasteners 94, such as so-called Allen screws threaded into the end portions 96 of parallel vertical side plates 98 forming the front and rear side of the platen 32. The platen side plates 98 are interconnected by opposite end plates 100 and an intermediate reinforcing plate 102 welded thereto, the open-topped box-shaped weldment construction thus formed being welded at its lower edges to the platen bottom plate or die attachment plate 104. The platen bottom plate 104 has a precisely-machined flat lower surface 105 with parallel T-slots 106 for receiving T-bolts (not shown) by which the upper half F of the die set D (FIGURE 4) is secured to the platen 32 and depends therefrom. The platen end plates 100 are spaced inwardly or inset from the outer edges of the end portions 96 (FIGURE 6) to accommodate the platen-actuating mechanism described below.

Welded or otherwise secured to the platen side plates 98 are bars 108 (FIGURES 1, 2 and 6) which are bored and threaded to receive stop screws 110 which engage the inner edges of the gibs 90 (FIGURE 6) so as to locate the latter accurately in their adjusted positions in which they are held by the tightening of the bolts 94 in the elongated slots 92. The stop screws 110 are locked in their adjusted positions by lock nuts 112 threaded thereon.

Bolted or otherwise secured to the opposite end plates 100 of the platen 32 at approximately the midportions thereof are cross head angle brackets 114 (FIGURES 1, 2, 3 and 6), the approximately triangular upper portions of which are bored at their outer ends to receive the threaded upper ends 116 of piston rods 118, the lower ends of which carry piston heads 120 (FIGURE 1) reciprocable in hydraulic cylinders 122 of the hydraulic motors 34. The upper cylinder heads 124 of the hydraulic cylinders 122 are bored for the passage of the piston rods 118 and provided with suitable conventional packing (not shown) for the preventing of leakage of hydraulic fluid. The lower cylinder heads 126 of the hydraulic cylinders 122 (FIGURES 1, 11 and 12) are flanged and bolted to the press bed top plate 60 by bolts 130 passing through spacing collars 128 mounted in enlarged holes in the bottom plates 63 of the press frame uprights 28. Tie rods in the form of elongated bolts 132 interconnect and tie together the cylinder heads 124 and 126. From FIGURE 3 it will be seen that the bottom plates 63 of the press frame uprights 28 rest directly upon the press bed top plate 60 adjacent the ends of the bolster 26 without the danger of deflecting or deforming the latter during operation.

It will be understood that the cylinder heads 124 and 126 of the hydraulic cylinders 122 are provided with suitable service ports and hydraulic piping (not shown) connecting the opposite ends of the hydraulic motors 34 to the hydraulic pump 134 (FIGURE 5) of the hydraulic power unit 44 mounted in the press head 30. The hydraulic pump 134 (FIGURE 3) is bolted or otherwise secured to the upper step of a stepped supporting structure 136, the lower step of which carries an electric driving motor 138 coupled as at 140 to the hydraulic pump 134. The stepped supporting structure 136 rests upon and is secured to the bottom plate 70.

Mounted on the bottom plate 70 of the press head or crown 30 is a hydraulic fluid tank or reservoir 142 adapted to contain hydraulic fluid for the pump 134 and drained by a petcock 144 (FIGURE 1). The hydraulic circuit for actuating the hydraulic motors 34 is conventional and contains components shown in FIGURE 5 and in the upper portion of FIGURE 1, such as an oil filter 146, a relief valve 148, an electromagnetically operated four-way valve 150, a hydraulic fluid gauge 152, a cutout box 154, a limit switch 156, and a headed limit switch actuating pin 158 projecting downwardly through the bottom plate 70 for engagement by the platen 32 at the top of its stroke in order to move the four-way valve 150 to its neutral position and halt the platen 32. Mounted on the lower part of the front of the right-hand press frame upright 28 (FIGURE 1) are further components of the electro-hydraulic system located within reach of the operator. These include a flow control valve 160 which enables the operator to control hydraulically the downward speed of the platen 32 by controlling the output of the pump 134, a six-button push button press control switch station 162, a manually-operable remote relief valve 164, and a hydraulic fluid pressure gauge 166. The illustration and description of the electrohydraulic circuit has been omitted from the drawings and specification because it is beyond the scope of the present invention and, if included, would add considerably to the specification and drawings in both length and complication. It will be evident from a consideration of FIGURES 1 and 3 that supplying oil or other hydraulic fluid under pressure from the pump 134 to the lower ends or lower cylinder heads 126 of the reciprocatory hydraulic motors 34 and exhausting of fluid from the upper heads 124 by suitable operation of the four-way valve 150 causes the piston heads 120 and piston rods 118 to rise, carrying with them the platen 32, and that reversal of this flow of hydraulic fluid will cause the platen 32 to descend, as described more fully below in the description of the operation of the invention.

Automatic Platen Levelling Device Construction

The automatic platen-levelling device 36 for maintaining the bottom surface 105 of the platen 32 continually parallel to the top surface 61 of the bolster 26 throughout its stroke is controlled by four toothed racks 168 (FIGURES 6 and 7) bolted to the four ways 84, which are rabbetted as at 170 to receive them. Meshing with each pair of racks 168 is a corresponding pair of pinions 172 (FIGURE 2) keyed or otherwise drivingly connected to an end shaft 174 journaled in bearing brackets or shaft hangers 176 bolted to the pads 178 (FIGURE 6) which in turn are welded to the platen end plates 100. Keyed or otherwise drivingly secured to each platen end shaft 174 at its midportion is a miter gear or bevel gear 180 which meshes with a corresponding miter or bevel gear 182. The miter gears 182 are keyed or otherwise drivingly secured to the opposite ends of a motion-transmitting shaft 184 rotatably mounted in bearing brackets 186 spaced at intervals throughout the width of the platen 32 and secured to the upper edges of parallel plates 188 which in turn are interconnected by an elongated plate 190 extending from end to end 100 of the platen 32 and welded or otherwise secured thereto (FIGURES 1 and 4). As a consequence of this mechanism 36, the four corners of the platen 32 are kept constantly and drivingly interconnected to the fixed racks 168 and to each other so that the bottom plate 104 cannot get out of parallelism with the bolster 26 when once adjusted in parallelism therewith, as explained below in connection with the operation of the invention.

Platen Position Indicator Construction

The platen position indicating device 38 (FIGURES 2, 9 and 10) shows the instantaneous position of the platen 32 and consequently the extent of the vertical opening at any given instant between the platen bottom plate 104 and the bolster 26 between the upper limit or daylight opening and the lower limit or shut height of the platen 32 relatively to the bolster 26. For this purpose, each of the platen end shafts 174 has keyed or otherwise drivingly secured thereto a sprocket 192 (FIGURES 9 and 10) around which passes a sprocket chain 194 over an idler sprocket 196 rotatably mounted upon a bracket 198 secured to the platen end wall 100 and also passing around a sprocket 200 keyed or otherwise secured to the inner end of a shaft 202 (FIGURE 9) mounted in a bearing bracket 204 secured to the platen bottom plate 104. The shaft 202 is coupled as at 206 to the operating shaft 208 of a platen position indicator 210 consisting of a conventional counter having a major dimension window 212 in which appears a numeral representing the number of inches or other measuring units representing the position of the platen, and an arcuate minor dimension window 214 in which appear fractions of the units of measurement appearing as digits in the major dimension window 214.

The slack in the sprocket chain 194 can be taken up by means of the bracket 198, which is adjustable vertically along the end wall 190 (FIGURE 10) by means of bolts 216 threaded into the end plate 100 and passing through the vertically-elongated slots 218 in the bracket 198. Stop screws 220 threaded through the horizontal leg 222 of the bracket 198 and engaging the platen bottom plate 104 hold the bracket 198 in adjustment with the sprocket 196 against the sprocket chain 194, in cooperation with the bolts 216.

*Platen Stop Construction*

The platen stop arrangement 42 (FIGURES 2, 3, 11 and 12) serves to limit the downward stroke of the platen 32 and thus prevent the crushing of clay or plaster of Paris models which may be mounted between the platen 32 and bolster 26. For this purpose, angle brackets 224 are bolted or otherwise mounted upon the platen end plates 100 near the four corners of the platen 32 (FIGURE 2) and have laterally-extending portions terminating in bosses 226 bored to receive the reduced diameter upper ends 228 of depending stop rods 230 secured therein. The lower ends 232 of the stop rods 230 (FIGURE 12) are adapted to engage the upper ends 234 of adjustable stop screw shafts 236 disposed coaxial with the stop rods 230. The stop screw shafts 236 are rotatably supported in a flanged sleeve bearing 238 which is bolted as at 240 to the top plate 60 of the press bed 24 and are threaded through sprocket nuts 242 which, as their name signifies, have sprocket teeth on an internally-threaded hub. Each sprocket nut 242 (FIGURE 12) is held against the lower side of the press bed top plate 60 by a centrally-bored retaining plate 244 and bearing plate or disc 246. Each retaining plate 244 is bored and threaded at three locations to receive bolts 248 passing through holes 250 in the press bed top plate 60 with their heads engaging the upper side thereof.

Figures 11, 12:
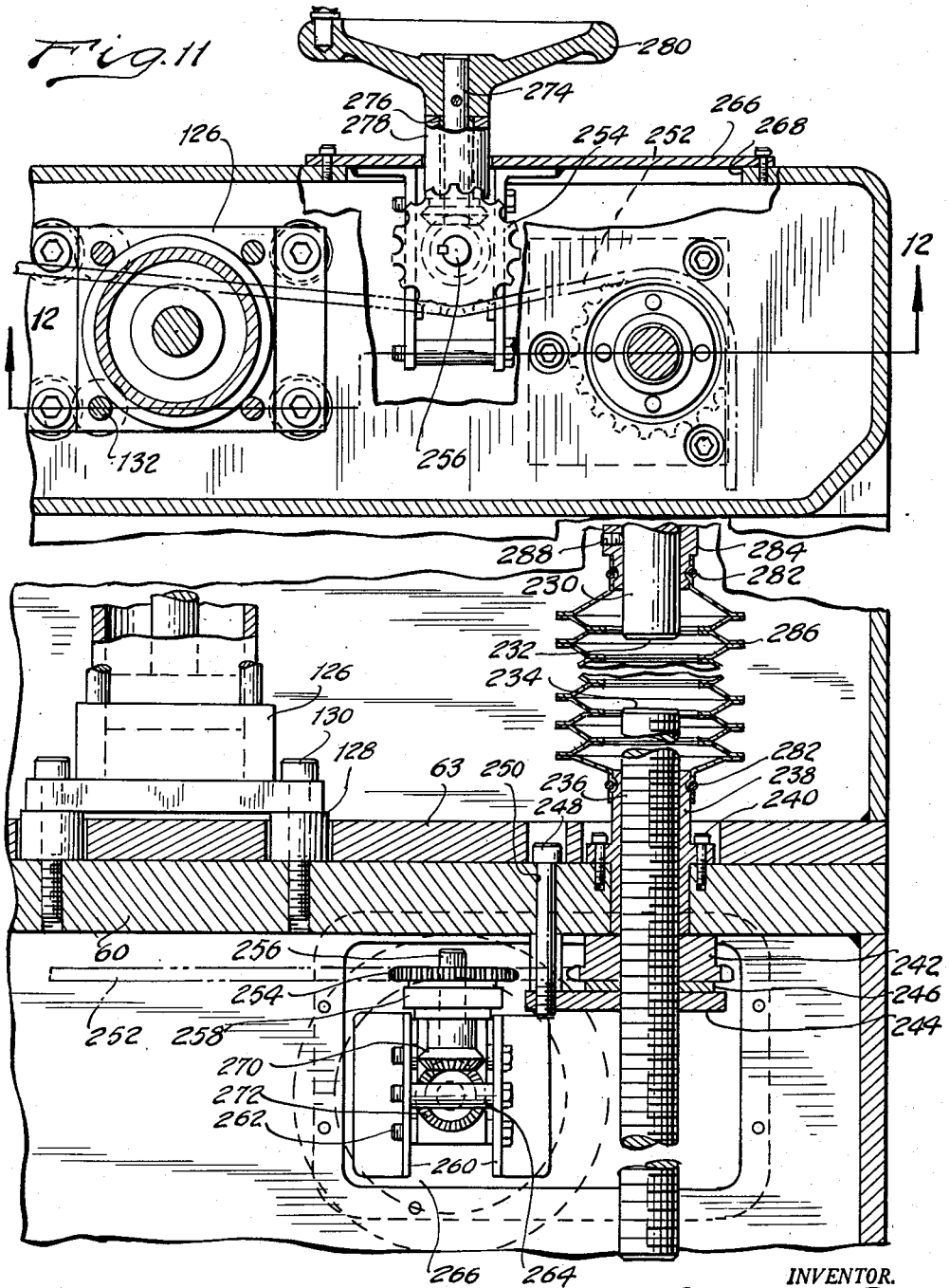
FIGURE 11 is an enlarged fragmentary horizontal section taken along the line 11—11 in FIGURE 1, showing details of the platen stop-operating mechanism.
FIGURE 12 is a vertical section taken along the line 12—12 in FIGURES 2 and 11.

Meshing with and partially encircling each of the sprocket nuts 242 is an endless sprocket chain 252 (FIGURE 11) which thus traverses an approximately rectangular path, beneath the top plate 60. Meshing with the sprocket chain 252 is a drive sprocket 254 keyed to a vertical shaft 256 which is rotatably supported in a vertical bearing 258 carried by angle plates or brackets 260 (FIGURE 12) interconnected by bolts 262 and tubular spacers 264 and themselves welded or otherwise secured to a vertical supporting plate 266 (FIGURE 11). The supporting plate 266 is bolted or otherwise secured to one of the bed end walls 54 adjacent a rectangular aperture 268 therein.

Keyed or otherwise drivingly secured to the lower end of the vertical shaft 256 is a bevel or miter gear 270 which meshes with a corresponding bevel or miter gear 272 keyed or otherwise drivingly secured to a horizontal shaft 274. The horizontal shaft 274 is rotatably supported in a sleeve bearing 276 which in turn is mounted within a barrel 278 (FIGURE 11) secured to and supported by the angle brackets 260. Pinned or otherwise secured to the outer end of the shaft 274 is the hub of a hand wheel 280. Thus, by rotating the hand wheel 280, the operator simultaneously rotates the four sprocket nuts 242 so as to raise or lower the screw shafts 236 simultaneously in their sleeve bearings 238, through the intermediate agency of the horizontal shaft 256, miter gears 272 and 258, vertical shaft 256, drive sprockets 254 and sprocket chain 252. This action raises and lowers the upper ends 234 of the screw shafts 236 and consequently raises and lowers the level at which the lower ends 232 of the stop rods 230 halt the platen 232. Secured as by the rings 282 (FIGURE 12) to the correspondingly-grooved bearing sleeve 238 and collar 284 is an accordion bellows 286 which protects the contact ends 232 and 234 of the stop rods 230 and screw shafts 236 from contamination by dirt and other foreign matter. A set screw 288 threaded into the collar 284 against each stop rod 230 secures the collar 284 to the stop rod 230.

*Platen Safety Latch Construction*

The automatic platen safety latching device 40 (FIGURES 13, 14 and 15) prevents accidental descent of the platen 32 and possible damage to work or injury to the operator upon the occurrence of an electric power failure or hydraulic fluid leakage. Bolted to the end walls 100 of the platen 32 at diagonally opposite corners thereof (FIGURE 5) are latch keepers 290 (FIGURE 15). Each latch kleper 290 consists of a keeper bracket 292 bolted to the end wall 100 and accurately positioned by a locating dowel 293. The keeper bracket 292 has coaxially-bored spaced parallel arms 294 containing a keeper rod 296 held stationary by a set screw 298. Rotatably mounted on the rod 296 is a keeper roller 300 lubricated by a lubricating fitting 302 through a passageway in the shaft 296.

Engageable with the under side of the keeper roller 300 of each keeper 290 is the hooked lower end portion 304 of a latch lever or latch hook 306 which is pivotally mounted on a pivot shaft 308. Each pivot shaft 308 in turn is mounted in a pair of coaxially-bored spaced brackets 310 bolted to the bottom plate 70 of the press head or crown 30. The latch lever 306 has a lower arm 312 depending from the pivot shaft 308 and of greater length and weight than the upper arm 314 thereof, and is offset relatively to the upper arm 314 so that the keeper roller lies almost directly beneath the pivot shaft 308 (FIGURE 13). The upper end 316 of the upper arm 314 is rounded for engagement by the reciprocating armature 318 of a reciprocatory electromagnetic motor or solenoid 320. Bolted to the bottom plate 70 of the press head or crown 30 near diagonally opposite corners thereof are angle brackets 322 to which the solenoids 320 of the safety latching device 40 are bolted or otherwise secured (FIGURE 13).

The winding (not shown) of the solenoid 320 is electrically connected into the energization circuit of the four-way valve 150 (FIGURE 5) so as to be simultaneously energized during energization of the four-way valve 150 by depressing the "Down" pushbutton switch of the switch station 162 to shift the four-way valve 150 to the position in which it supplies pressure fluid to the upper cylinder heads 124 of the reciprocatory hydraulic motors 34 so as to move the platen 32 downward. Such energization of the solenoid 320 projects its armature 318 to the right (FIGURE 13) to swing the latch lever 306 clockwise around its pivot shaft 308 and withdraw the hooked lower end 304 from beneath the keeper roller 300. When the platen 32 is in its raised position and the "down" pushbutton switch and four-way valve circuit is either intentionally or accidentally de-energized, the consequent de-energization of the solenoid 320 and the retraction of its armature 318 permits the heavier offset lower arm 312 to swing the latch lever 306 counter-clockwise around its pivot shaft 308 by gravity so as to move the hooked lower end 304 beneath the keeper roller 290. Thus, the safety latch hooks 306 are always in their safety latching positions except when the operator desires a downward movement of the platen 32.

*Modified Automatic Platen-Levelling Device Construction*

The modified die-spotting press, generally designated 330, shown in FIGURES 16 and 17, differs from the die-spotting press 20 of FIGURES 1 to 15 inclusive principally by providing a somewhat modified automatic platen-levelling device, generally designated 332, and also by providing a hydraulically-extensible bolster arrangement, generally designated 334. The latter is subsequently described below. In FIGURES 16 and 17, the adjustable stop rod arrangement of the die-spotting press has been omitted to simplify the showing, and to avoid obscuring other details of the mechanism. The die-spotting press of FIGURES 16 and 17 also has a platen raising and lowering arrangement sufficiently similar to that of the press 20 of FIGURES 1 to 15 inclusive to bear the same reference numerals and to require no duplication of the previous description.

The modified press 330 has a bed, generally designated 336, of built-up construction described in more detail below, and hollow uprights 338 rising therefrom and of construction similar to the uprights 28 of the die spotting press 20 described above. Bolted or otherwise secured to the uprights 338 with their teeth facing one another are four toothed racks 340 guided by gibs and ways (not shown) similar to those shown in FIGURE 2. On the uprights 338 is mounted a platen 342 of generally similar construction to the platen 32 and similarly having a T-slotted bottom plate 344, front and rear plates 346, end plates 348 and central partitions 350, with an inermediate partition 352 extending between the end walls 348 and auxiliary transverse partitions 354 disposed parallel to and slightly inward from the end walls 348 in spaced relationship and carrying spaced parallel stepped bearing blocks 356 and 358 extending from the side walls 346 to the intermediate partition 352 (FIGURE 17) and welded or otherwise secured thereto. This construction is similar at both ends of the platen 342, only one end thereof being shown in FIGURE 17. The stepped bearing blocks 356 and 358 at each end of the platen 342 are of similar construction but have steps descending in opposite directions, hence may be referred to as of right-hand and left-hand arrangement.

The bearing blocks 356 and 358 are each bored to receive outer lower bearing sleeves 360 and inner upper bearing sleeves 362 (FIGURE 17) for receiving outer lower parallel cross shafts 364 and upper inner stub shafts 366. Keyed or otherwise drivingly secured to the parallel cross shafts 364 are outer pinions 368 which on one side mesh with the teeth of the racks 340 and on the opposite side mesh with idler pinions 370 which are rotatably mounted upon the stub shafts 366 in intermeshing engagement with one another (FIGURE 17). As a consequence of this construction, the outer pinions drivingly connected to the outer shaft 364 and meshing with the four racks 340 at the four corners of the platen 342 prevent sidewise tilting of the platen 342 and their interconnection by the intermeshing idler pinions 370 locks them in synchronism so as to prevent forward and rearward tiling of the platen 342 as the platen 342 is raised and lowered by the reciprocatory hydraulic motors 34, in the manner described briefly above in connection with the construction of the die spotting press 20 and more particularly described in connection with the operation of both of the die spotting presses 20 and 330. The toothed ratchet bars 372 (FIGURE 16) mounted on the channel side member reinforcing plate 68 are for a platen safety-locking purpose not connected with the present invention and consequently require no further description.

*Modified Extensible Bolster Arrangement*

The modified extensible bolster arrangement 334, as before, provides a T-slotted plate-shaped bolster 374 similar in construction to the bolster 36 of the die spotting press 20 of FIGURE 1 and similarly has its opposite ends inset from the frame side members or uprights 338 (FIGURE 16). The bed 336, however, has spaced top plates 376 instead of a single continuous top plate 60, with the space between them occupied by a relatively movable bolster supporting top plate 378 forming the top of a reciprocable bolster carriage, generally designated 380. In order to reciprocably support the bolster carriage 380 upon the bed 336, the latter is provided with slightly inclined approximately horizontal parallel channel members 382 welded or otherwise secured to web plates 384, 386 and 388 (FIGURE 16) extending from the top plates 376 at their inner edges to the bottom plate 390 of the bed 336. Disposed between the lower and intermediate web plates 388 and 386 is a horizontal platform plate 392 for supporting parallel reciprocatory hydraulic motors, generally designated 394 and described in more detail below. Extending between and welded to the web plates 388, platform plate 392 and bed bottom plate 390 is a vertical reinforcing plate 395.

Bolted or otherwise secured to each of the inclined channels 382 is a spacer or filler plate 396 engaging the upper and lower parallel way bars 398 and 400 respectively. The way bars 398 and 400 are preferably of hardened and ground steel. Mounted in the space between the upper and lower way bars 398 and 400 and slidably engaging these members is a gib block or slide block 402 which is bolted or otherwise secured to a slightly inclined carriage side plate 404. This construction is duplicated at the opposite sides of the bolster carriage 380, but the intermediate portion of the press 330 adjacent its right-hand side (FIGURE 16) has been omitted to enable showing the construction on a larger scale than would otherwise be possible.

The inclined side plates 404 of the bolster carriage 380 (FIGURE 16) are welded at their upper edges to the top plate 378 and at their lower edges to outer horizontal intermediate plates 406 for attachment of the hydraulic motors 394 (only one of which is shown). The inner edges of the intermediate plates 406 are welded to outermost partition or reinforcing plates 408 and reinforced by triangular gusset plates 410. At their lower edges both the outer partition plates 408 and the gusset plates 410 are welded or otherwise secured to the carriage bottom plate 412, the central portion of which is reinforced by a central vertical partition plate 414 similarly welded at top and bottom to the carriage top plate 378 and bottom plate 412, the latter of which is centrally grooved to receive a wear plate 416 bolted thereto. The wear plate 416 is similarly grooved to receive a coacting wear plate or bearing plate 418 similarly bolted or otherwise secured to the platform plate 392. It will be understood that the bars 398 and 400, the gib blocks 402 and wear plates 416 and 418 are of hardened steel or with bronze components for efficient low-friction sliding engagement, and that suitable conventional lubricating means (not shown) is provided for them. Limit switches 420 (only one of which is shown) are mounted on the intermediate webs 386 (FIGURE 16) for operative engagement by cam elements carried by the bolster carriage 380 to control the extent to which the carriage 380 will move on its advancement and retraction stroke.

Each of the parallel reciprocatory hydraulic motors 394 (only one of which is shown) for reciprocating the bolster carriage 380 and bolster 334 consists of cylinder heads 424 and 426 (FIGURE 17) bolted or otherwise secured to the platform plate 392 and closing the opposite ends of a cylinder 428 in which a hydraulic plunger 430 is reciprocably mounted. The hydraulic plunger 430 has a rod 432 extending outward through the cylinder head 426, which is suitably supplied with conventional packing means for preventing leakage of hydraulic fluid around the rod 432. The free or outer end of the rod 432 is threaded into a bracket 434 depending from and bolted or otherwise secured to the outer horizontal intermediate plates 406 (FIGURE 16) and secured in position by lock nuts 436. The cylinder heads 424 and 426 are provided with service ports (not shown) for supplying and withdrawing hydraulic fluid from the opposite ends of the cylinders 428 in order to reciprocate the plunger 430, and these in turn are connected by hydraulic piping, generally designated 438, to the remainder of the hydraulic circuit by way of a suitable four-way valve for alternately supplying hydraulic pressure fluid from the hydraulic pump 134 (FIGURES 3 and 5) to the opposite ends of the hydraulic cylinders 428 for advancing and retracting the bolster carriage 330 and bolster 334, as described below in the description of the operation of the invention.

The operations of the individual components of the die spotting press 20 have been described in detail above in connection with their constructions. Accordingly, it is believed sufficient to describe here the general operation of the die spotting press 20 without repeating specific details thereof already described above.

*Operation*

Prior to the operation of the die spotting press 20 shown in FIGURES 1 to 15 inclusive, the die halves F and M to be spotted are secured to the platen bottom plate 104 and bolster 26 by means of T-bolts or other fasteners. The arrangement shown in dotted lines in FIGURE 4 places the female die half F above the male die half M, but such arrangement can be and often is reversed. In FIGURE 4, the die half F is shown as telescoped with the die half M, rather than bolted to the platen 32, which is in its raised position in FIGURE 4. The screw stop shafts 236 are then moved upward or downward by rotating the hand wheel 280 until their upper ends 234 are disposed at the correct level for engagement by the lower ends 232 of the stop rods 230 depending from the platen 32. This spaces the dies F and M apart from one another the desired distance for properly accommodating the sheet metal which is to be stamped by them into a workpiece. The operator then starts the motor 138 by depressing the proper button in the push-button station 162, whereupon the pump 134 starts delivering pressure fluid to the hydraulic circuit.

To cause the platen 32 to descend, the operator then depresses the switch button controlling the action of the four-way valve 150 to shift the latter by its solenoids to supply pressure fluid to the upper cylinder heads 124 of the hydraulic motors 34 and at the same time to withdraw fluid from the lower cylinder head 126 thereof. This action causes the pistons 120 and piston rods 118 to descend within the cylinders 122, thereby causing the platen 32 and the die half secured to its bottom plate 104 to descend toward the die half mounted on the bolster 26.

When the platen 32 has descended to the desired level, as when the lower ends 232 of the stop rods 230 engage the upper ends 234 of the stop screw shafts 236, the operator depresses a further switch button of the push button station 162 to shift the four-way valve 150 to its neutral position and to halt further descent of the platen 32. Meanwhile, if there appears to be an actual or possible interference between the die halves F and M, the operator reverses the four-way valve 150 by depressing the proper switch button of the push button station 162, thereby causing pressure fluid to enter the lower ends of the cylinders 132 and to be exhausted from the upper ends thereof, thereby raising the piston rods 118 and platen 32 and die half connected thereto.

When the upper die half has been raised a sufficient distance for the keeper rods 296 of the latch keepers 290 to reach and push aside the curved lower end portions 304 of the lower arms 312 of the latch levers 306, the latter first swing outward and then swing beneath the keeper rollers 300 on the keeper rods 296 because of the pushing action imparted to the latch levers 306 by the solenoid armatures 318 (FIGURE 13) due to the concomitant energization of the solenoid 320. This action hooks the keepers 290 and the platen 32 connected thereto in their raised positions. Immediately thereafter the platen 32 engages and moves upward the limit switch actuating pin 158 (FIGURE 1), actuating the limit switch 156 to shift the four-way valve 150 to its neutral position and halt the upward travel of the platen 32.

The workman or other operator having the task of spotting the die halves F and M of the die set D carefully removes excessive stock from either or both of the die halves by means of a cutting tool or a grinding tool, as is most desirable, preferably using a colored indicating coating such as Prussian Blue to indicate the locations where stock is to be removed. The foregoing operation of causing the die halves to approach and recede from one another so that the portion not properly mating will scrape off the colored indicating coating, indicates to the operator the necessity of the further use of the stock-removing tool to remove the superfluous stock interfering with the accurate interfitting of the die halves.

Meanwhile, if a power failure occurs and the motor 138 becomes de-energized while the platen 32 is in its fully-raised position, the solenoids 320 become de-energized, permitting the latch hooks 306 to swing inward under the influence of gravity so that their hooked lower ends 304 intercept the keeper rollers 300 on the keepers 290 and retain the platen 32 and die half attached thereto in their raised positions.

While the platen 32 is ascending or descending, the automatic platen levelling device 36 (FIGURE 2) automatically prevents any of the side or corners of the platen 32 from descending faster than the other sides or corners because of the stationary racks 168 and the interconnecting of the pinions 172 by the end shafts 174, the miter gears 180 and 182 and the motion-transmitting shaft 184. At the same time, the position or height of the platen bottom plate 104 above the bolster 26 is accurately indicated by the platen position indicator 210, the distance being indicated by the numerals appearing in the windows 212 and 214 thereof (FIGURE 10).

The operation of the modified spotting press 330 of FIGURES 16 and 17 is generally similar to that of the spotting press 20 described above, with the exception of the fact that the automatic levelling of the platen 342 is accomplished in a different manner by the stationary racks 340 engaging the outer pinions 368 which in turn engage the inner pinions 370, these also engaging one another while the parallel shafts 364 interconnecting the gear train at the opposite ends of the platen 342 prevent relative movement therebetween. The extensible bolster 334 of the press 330 also adds to the convenience, accessibility and efficiency of the latter enabling the lower die half to be moved out from beneath the upper die half or back beneath the upper die half by supplying pressure fluid to one end of the hydraulic motors 394 while exhausting hydraulic fluid from the opposite ends thereof. The bolster carriage 380 moves into an extended position shown in partially complete stroke by the dotted lines in the lower right-hand corner of FIGURE 17. The limit switches 420 control the halting of the carriage 380 at the opposite ends of its stroke by controlling the shifting of the conventional solenoid-actuated four-way valve (not shown) controlling the hydraulic motors 394.

Another feature of construction of both of the spotting presses 20 and 330 of the present invention is that the present construction utilizes standard parts which are available on the open market, for example, standard gears, racks, shafts, bearings, gibs and ways, and does not require the specially-constructed and consequently extremely expensive parts previously required in prior die spotting presses. Moreover, the present invention provides a readily-detachable crown or press head 30 (FIGURES 1, 3 and 5) which houses the hydraulic pump 134, driving motor 138 and the associated components of the hydraulic and electric circuit shown in FIGURES 1 and 5. As a consequence of this present construction, the press head or crown 30 can be quickly and easily removed, together with the mechanical, hydraulic and electrical components carried thereby, as a "package unit" for quick and easy repairs or replacements because of the ready accessibility of these components thus provided.

*Platen-Operated Die Positioning Device*

The platen-operated die positioning device, generally designated 440, shown in FIGURES 18 and 19 is used with the die spotting press 20 shown in FIGURES 1 to 15 inclusive, hence reference is made thereto for details of the press 20. For purposes of simplification of showing, the press 20 of FIGURES 18 and 19 is illustrated only as regards the press bed 24, bolster 26 and vertically-reciprocable platen 32. As before, the bolster 26 and platen 32 have T-slots 62 and 106 respectively (FIGURES 1 and 18) and facing surfaces 61 and 105 respectively. The die D to be hauled aboard the press bolster 26 is provided with one or more horizontal threaded holes 442 in a side thereof for the reception of the correspondingly threaded shank of one or more hooks 444 locked in position by a lock nut 446 threaded on the shank of each hook 444.

The die-positioning device 440 includes upper and lower pulley units, generally designated 448 and 450 respectively, and a die hauling cable unit 452 operated by cooperating pulley units 448 and 450. The lower pulley unit 450 is provided with an elongated lower bracket 454 in the form of a bar of T-shaped cross-section snugly but removably fitting the T-slots 62. Bolted as at 462 to the opposite sides of the lower bracket 454 at a location behind the rearward edge of the bolster 26 are upstanding parallel plates 464 (FIGURE 19) which are drilled in alignment at 466 to receive an axle bolt 468, the shank of which is threaded to receive a retaining nut. Mounted on the axle bolt 468 between the plates 464 is a bushing 472 which not only serves as a spacer between the plates 464 but also rotatably receives a bearing sleeve upon which a grooved lower pulley 476 is rotatably mounted. The outer end of the bracket 454 overhangs the rearward edge of the bolster 26 in a cantilever manner and is provided with a substantially vertical hole 478 which serves as an anchorage for the enlargement or other anchor 480 on the lower end of a cable 482 forming the principal part of the cable assembly 450. The opposite end of the cable 482 is provided with a loop 484 which passes over the hook 444 and is secured to the adjacent portion of the cable 482 by a conventional cable coupling 486. Where the die D already has an upstanding projection, such as a bolt, the loop 484 is passed over it, and the addition of the hook 444 becomes unnecessary.

The upper pulley 448 is of similar construction to the lower pulley unit 450 except that the cable anchorage 478 is unnecessary and is accordingly omitted. Otherwise, the parts are substantially identical, hence are designated with the same reference numerals, except that the grooved pulley of the upper pulley 448 is separately designated 490 in order to distinguish it from the lower pulley 476 in describing the operation. As shown in FIGURE 18, the lower end of the cable 482 is anchored in the hole 478 in the lower pulley bracket 454 by means of the enlargement 480 or other cable anchoring means, and passes upward over the upper pulley 490 (FIGURE 18), then downward around the lower pulley 476 and thence horizontally to its loop 484 by which it is secured to the hook 444. It will be understood that in the case of exceptionally heavy dies, two or more of the die positioning devices 440 may be used, whereas with dies of the weights commonly encountered a single die positioning device 440 will ordinarily be found sufficient.

In the operation of the die positioning device 440 (FIGURE 18), let it be assumed that the platen 32 has been lowered to its lowest convenient position and the cable 482 of the cable unit 452 has been anchored at 480 and trained around the upper and lower pulleys 490 and 476, looped over the hook 444 and coupled as at 486. To haul the die D aboard the press 20, the operator supplies power to the platen 32 in the manner described above to cause the platen 32 to move upward, carrying with it the upper pulley unit 448. The consequent heavy travel of the upper pulley 490 pulls upward on the cable 482 which, by the cooperating action of the lower pulley 476, causes the cable loop 484 and die D to be drawn toward the lower pulley 476 with a horizontal travel which is twice the vertical travel of the platen 32, due to the double pulley arrangement.

Meanwhile, the operator by any suitable means, such as by a crowbar, raises the leading edge of the die D until it is above the edge of the bolster 26 and enters freely upon the upper surface 61 of the press bolster 26. The upward motion of the platen 20 thus causes a horizontal motion of the cable loop 484 so as to haul the die D along the upper surface 61 of the press bolster 26. When the die D has reached the desired position upon the press bolster 26, the operator halts the upward motion of the press platen 32, and uncouples the cable loop 484, 486 by removing it from the hook 444, thus disconnecting the die D from the die-positioning cable unit 452. The lower and upper pulley units 450 and 448 may then be removed, if they are in the way of subsequent operations, by sliding their brackets 454 out of their respective T-slots 62 and 106. Die spotting operations can then be carried out in the usual manner known to those skilled in the die-making art. During operation, the pull of the cable 482 upon the pulleys 476 and 490 perpendicular to their respective brackets 454 causes the brackets 454 to be firmly wedged in their respective T-slots 106 and 62, and no slippage occurs.

What I claim is:

1. A die spotting press for precisely mating interfitting die halves, said press comprising a generally vertical press frame structure, a press platen mounted in said frame structure for vertical reciprocation relatively thereto, a rack stationarily mounted vertically in said frame structure, a pinion located upon said platen and meshing with said rack, a dimensioned platen position indicator mounted on said platen, and substantially slipless motion-transmitting mechanism drivingly connecting said pinion to said indicator.

2. A die spotting press, according to claim 1, wherein said mechanism includes a shaft drivingly connected to said pinion and toothed means drivingly connecting said shaft to said indicator.

3. A die spotting press, according to claim 2, wherein said toothed means includes a driving sprocket on said shaft, a driven sprocket on said indicator, and a sprocket chain drivingly interconnecting said driving and driven sprockets.

4. In an electric-motor-operated press, a generally vertical frame structure, a press platen mounted in said frame structure for vertical reciprocation, a latch mounted on said frame structure and movable into and out of latching engagement with said platen in the raised position of said platen, an electromagnetic latch operating device electrically connected in circuit with the electric operating motor of the press and responsive to the electric energization of the motor for withdrawing said latch from latching engagement with said platen, and means connected to said latch and responsive to de-energization of said latch operating device for moving said latch into latching engagement with said platen.

5. An electric-motor-operated press, according to claim 4, wherein said means includes a counterweighted portion connected to said latch and responsive to the force of gravity for moving said latch into latching engagement with said platen in response to de-energization of said latch-operating device.

References Cited in the file of this patent

UNITED STATES PATENTS

| | | |
|---|---|---|
| 1,002,747 | Parish | Sept. 5, 1911 |
| 1,443,176 | Gabriel | Jan. 23, 1923 |
| 1,469,689 | Prius | Oct. 2, 1923 |
| 1,496,274 | Landin | June 3, 1924 |
| 1,827,558 | Byerlein | Oct. 13, 1931 |
| 1,900,050 | Ernst | Mar. 7, 1933 |
| 2,102,842 | Glasner | Dec. 21, 1937 |
| 2,217,172 | Laussuqc | Oct. 8, 1940 |
| 2,284,569 | Glasner | May 26, 1942 |
| 2,305,610 | Ernst | Dec. 22, 1942 |
| 2,670,676 | Green | Mar. 2, 1954 |
| 2,672,836 | Ernst | Mar. 23, 1954 |
| 2,884,885 | Bannon | May 5, 1959 |
| 2,889,507 | Kennedy et al. | June 2, 1959 |
| 2,996,025 | Georgeff | Aug. 15, 1961 |
| 3,002,479 | Johansen et al. | Oct. 2, 1961 |

FOREIGN PATENTS

| | | |
|---|---|---|
| 847,257 | France | June 26, 1939 |
| 875,339 | France | June 15, 1942 |